US006957123B2

(12) United States Patent
Nakamura (10) Patent No.: US 6,957,123 B2
(45) Date of Patent: Oct. 18, 2005

(54) AUTOMATIC PROGRAMMING APPARATUS

(75) Inventor: Takayuki Nakamura, Yamatokoriyama (JP)

(73) Assignees: Mori Seiki Co., Ltd., Yamatokoriyama (JP); Intelligent Manufacturing Systems International, Sacramento, CA (US)

( * ) Notice: Subject to any disclaimer, the term of this patent is extended or adjusted under 35 U.S.C. 154(b) by 0 days.

(21) Appl. No.: 10/885,773

(22) Filed: Jul. 8, 2004

(65) Prior Publication Data

US 2005/0010327 A1 Jan. 13, 2005

(30) Foreign Application Priority Data

Jul. 10, 2003 (JP) .............................. 2003-195107

(51) Int. Cl.[7] ............................................. G06F 19/00
(52) U.S. Cl. ...................................... 700/181; 700/159
(58) Field of Search ................................ 700/181, 159

(56) References Cited

FOREIGN PATENT DOCUMENTS

JP 5-165509 7/1993

*Primary Examiner*—Leo Picard
*Assistant Examiner*—Carlos Ortiz-Rodriguez
(74) *Attorney, Agent, or Firm*—Westerman, Hattori, Daniels & Adrian, LLP (57) ABSTRACT

An automatic programming apparatus 1 comprises: a tool path data generating section 12 which generates movement path data for a semifinishing tool by analyzing an NC program; a work shape data generating section 16 which computes areas over which blank is to be machined on the basis of the movement path data, and which generates shape data of a semifinished workpiece by deleting the machined areas from the shape of the blank and also generates attribute data indicating that the faces newly generated by the deletion processing are machined faces; a CL data generating section 20 which generates CL data by setting the edges of the machined faces as machining portions on the basis of the shape data of the semifinished workpiece and attribute data; and an NC program generating section 23 which converts the CL data into the NC program for performing the chamfering.

2 Claims, 5 Drawing Sheets

Face

| Face number | Edge number |
|---|---|
| F1 | E1, E2, E3, E4 |
| F2 | E5, E6, E7, E8 |
| F3 | E1, E9, E5, E10 |
| ...... | |

Edge

| Edge number | Vertex number |
|---|---|
| E1 | V1, V2 |
| E2 | V2, V3 |
| E3 | V3, V4 |
| ...... | |

Vertex

| Vertex number | Coordinate values | | |
|---|---|---|---|
| | X | Y | Z |
| V1 | X1 | Y1 | Z1 |
| V2 | X2 | Y2 | Z2 |
| V3 | X3 | Y3 | Z3 |
| ...... | | | |

Face equation

| Face number | Coefficients of equation |
|---|---|
| F1 | A1, B1, C1, D1 |
| F2 | A2, B2, C2, D2 |
| F3 | A3, B3, C3, D3 |
| ...... | |

Edge equation

| Edge number | Coefficients of equation |
|---|---|
| E1 | a1, b1, c1, d1 |
| E2 | a2, b2, c2, d2 |
| E3 | a3, b3, c3, d3 |
| ...... | |

| Shape data | | | Attribute data | | |
|---|---|---|---|---|---|
| Face F1~F8 | Edge E1~E18 | | Face number | : F 7 | Machined face |
| Face equation F1~F8 | Edge equation E1~E18 | Vertex V1~V12 | Face number | : F 8 | Machined face |

AUTOMATIC PROGRAMMING APPARATUS

BACKGROUND OF THE INVENTION

1. Field of the Invention

The present invention relates to an automatic programming apparatus which automatically generates an NC program for numerically controlling a machine tool, or more specifically an NC program for applying chamfering on the edges of machined faces of a semifinished workpiece obtained by machining a blank to be machined into a predetermined shape.

2. Description of the Prior Art

When a blank as a material to be machined is machined into a prescribed product shape by a machine tool, burrs may be generated on the edges of the machined faces. Such burrs not only can hurt a human operator if he accidentally touches them, but are also undesirable from the point of view of appearance of the product; therefore, the burrs are removed as needed by using, for example, a robot, and the blank is finished into the final product shape.

The robot is configured to operate in accordance with a pre-generated control program to deburr the edges of the machined faces of the product by chamfering (slight-chamfering) the edges by using a tool (grinder or the like) attached to its hand. In the prior art, such a control program is generated in the following manner.

First, the operator displays the product's CAD data generated by a CAD system on a CRT and selects a suitable geometric element (geometric line, etc.) from the displayed data by using a mouse or the like, to generate a tool path so that the chamfering will be applied to the portion corresponding to the selected geometric element; then, based on the thus generated tool path, the control program is generated (refer to Japanese Unexamined Patent Publication No. 5-165509).

However, the above method, which requires the operator to select and specify the portion of the product to be chamfered when generating the control program, not only has been inefficient, but also has had the problem that, due to the operator's error (human error), a portion that actually need not be chamfered may be selected and specified as the portion to be chamfered or, conversely, the portion that needs chamfering may not be selected and specified as the portion to be chamfered.

The present invention has been devised in view of the above situation, and an object of the invention is to provide an automatic programming apparatus that can accurately and efficiently generate an NC program for performing chamfering.

SUMMARY OF THE INVENTION

In order to attain the above-mentioned object, an automatic programming apparatus in accordance with the present invention which automatically generates an NC program for applying chamfering on edges of machined faces of a semifinished workpiece obtained by machining a blank to be machined into a predetermined shape, the apparatus comprising:

an NC program storing section which stores an NC program organized so as to machine the blank into the semifinished workpiece, the NC program including at least movement position of a tool;

a blank data storing section which stores shape data defining the shape of the blank and material data concerning the material of the blank;

a tool shape data storing section which stores shape data defining the shape of the tool to be used for machining into the semifinished workpiece;

a work shape data storing section which stores shape data defining the shape of the semifinished workpiece;

a chamfering tool data storing section for storing data concerning specifications, such as dimensions and material, of a chamfering tool;

a machining condition data storing section which stores machining conditions that are set in accordance with the material of the blank and the specifications of the chamfering tool;

a tool path data generating section which analyzes the NC program stored in the NC program storing section and, after extracting the movement position of the tool, generates tool path data concerning the movement path of the tool;

a work shape data generating section which, based on the shape data respectively stored in the blank data storing section and the tool shape data storing section and on the tool path data generated by the tool path data generating section, successively computes areas over which the blank is to be machined by the semifinishing tool when the semifinishing tool is successively moved along the tool path, and which generates shape data relating to the semifinished workpiece by performing processing to delete the computed machined areas from the shape of the blank also generates attribute data indicating that faces newly generated by performing processing to delete the machined areas from the shape of the blank are the machined faces, the generated shape data of the semifinished workpiece and attribute data then being associated with each other and stored in the work shape data storing section;

a CL data generating section which, based on the shape data of the semifinished workpiece and attribute data stored in the work shape data storing section, recognizes the machined faces of the semifinished workpiece and the shapes of the machined faces and sets the edges of the recognized machined faces as machining portions, and then, based on the blank material data stored in the blank data storing section and the data respectively stored in the chamfering tool data storing section and the machining condition data storing section, generates chamfering CL data of the thus set portions which at least includes data concerning tool used for chamfering, data concerning feed speed and rotational speed of the chamfering tool, and data concerning movement position of the chamfering tool in a work coordinate system; and an NC program generating section which generates a chamfering NC program from the movement position in the work coordinate system defined in the CL data generated by the CL data generating section.

According to this invention, the NC program organized so as to machine the blank to be machined into the semifinished workpiece of a prescribed shape by using an appropriate kind of tool such as an end mill or a face mill, i.e., and composed by including at least the movement position of the tool, is stored in the NC program storing section.

On the other hand, the shape data defining the shape of the blank and the material data concerning the material of the blank are stored in the blank data storing section, and the shape data defining the shape of the tool used for machining into the semifinished workpiece (the tool designated in the NC program) is stored in the tool shape data storing section.

The shape data is constructed by including at least data of vertices each described by a coordinate value in three-dimensional space, equation data of edges each being a line joining two vertices, edge data for associating each edge with the two vertices, equation data of faces each bounded by edges, and face data for associating each face with the edges.

The data concerning the specifications of the chamfering tool for performing chamfering, such as the dimensions and material of the chamfering tool, is stored in the chamfering tool data storing section, and the data concerning the machining conditions set in accordance with the material of the blank and the specifications of the chamfering tool is stored in the machining condition data storing section. The machining condition data is data concerning the feed rate (feed per tooth), cutting speed, etc. of the chamfering tool, and is set for each chamfering tool in accordance with the material of the blank and the material of the tool.

The tool path data generating section generates the tool path data concerning the movement path of the tool after analyzing the NC program stored in the NC program storing section and extracting the movement position of the tool.

Next, based on the shape data respectively stored in the blank data storing section and the tool shape data storing section and on the tool path data generated by the tool path data generating section, the work shape data generating section successively computes areas over which the blank is to be machined by the semifinishing tool when the semifinishing tool is successively moved along the tool path, and generates the shape data defining the shape of the semifinished workpiece by performing processing to delete the computed machined areas from the shape of the blank, while also generating the attribute data indicating that the faces newly generated by performing processing to delete the machined areas from the shape of the blank are the machined faces.

That is, after computing the area over which the shape of the tool interferes with the shape of the blank when the tool is moved along the tool path relative to the blank, the blank shape data is updated by generating new faces in the portion of the blank shape corresponding to the interference area so as to obtain a shape by subtracting the interference area from the blank shape by performing, for example, a Boolean operation or the like. The shape data concerning the semifinished workpiece obtained by machining the blank is thus generated.

At this time, the attribute data is also generated that indicates that the newly generated faces are the machined faces (faces machined by the tool) and the thus generated shape data of the semifinished workpiece and attribute data are associated with each other and stored in the work shape data storing section.

Next, based on the data respectively stored in the work shape data storing section, the blank data storing section, the chamfering tool data storing section, and the machining condition data storing section, the CL data generating section generates the chamfering CL data which at least includes data concerning the tool used for chamfering, data concerning the feed speed and rotational speed of the tool, and data concerning the movement position of the chamfering tool in the work coordinate system.

More specifically, of the plurality of faces forming the semifinished workpiece, the faces machined by the tool and their shapes are recognized based on the shape data of the semifinished workpiece and attribute data stored in the work shape data storing section; then, the edges of the recognized machined faces are set as the machining portions, and the sequence of machining is determined for the thus set machining portions.

Next, the chamfering tool to be used for the machining is selected based on the blank material data stored in the blank data storing section by referring to the data stored in the chamfering tool data storing section, after which the machining conditions that match the selected chamfering tool are set by referring to the data stored in the machining condition data storing section.

Thereafter, based on the thus set machining conditions, data concerning the rotational speed and feed speed of the selected chamfering tool is generated for each machining portion in accordance with the above determined sequence of machining, while also generating the movement position data of the chamfering tool in the work coordinate system, and the thus generated data are set as the CL data.

The NC program generating section generates the chamfering NC program from the movement position in the work coordinate system defined in the CL data generated by the CL data generating section.

The work coordinate system is the coordinate system that is set for the work (blank or semifinished workpiece) fixed on the machine tool.

As described above, according to the automatic programming apparatus of the present invention, the shape data of the semifinished workpiece is generated by deleting from the blank shape data the areas of the blank to be machined by the tools, while also generating the attribute data indicating that the faces newly generated by deleting the machined areas are the machined faces, and the thus generated shape data and attribute data are stored by associating them with each other; then, based on the thus stored shape data and attribute data, the machined faces of the semifinished workpiece and their shapes are recognized, and the edges of the recognized machined faces are set as the portions to be chamfered. Accordingly, the chamfering NC program can be generated accurately and efficiently by automatically selecting only the portions that need chamfering. Then, using the thus generated NC program, burrs generated on the edges of the machined faces of the semifinished workpiece during the machining by the machine tool can be effectively removed by the machine tool.

Preferably, the NC program generating section, based on the chamfering NC program it generated and the semifinishing NC program stored in the NC program storing section, performs processing to organize these NC programs into one NC program for executing the semifinishing and the chamfering in succession. This configuration serves to enhance the efficiency, since the series of machining operations in the machine tool for machining the blank into the final product shape can be performed using one NC program.

DESCRIPTION OF THE PREFERRED EMBODIMENTS

Figure 1:
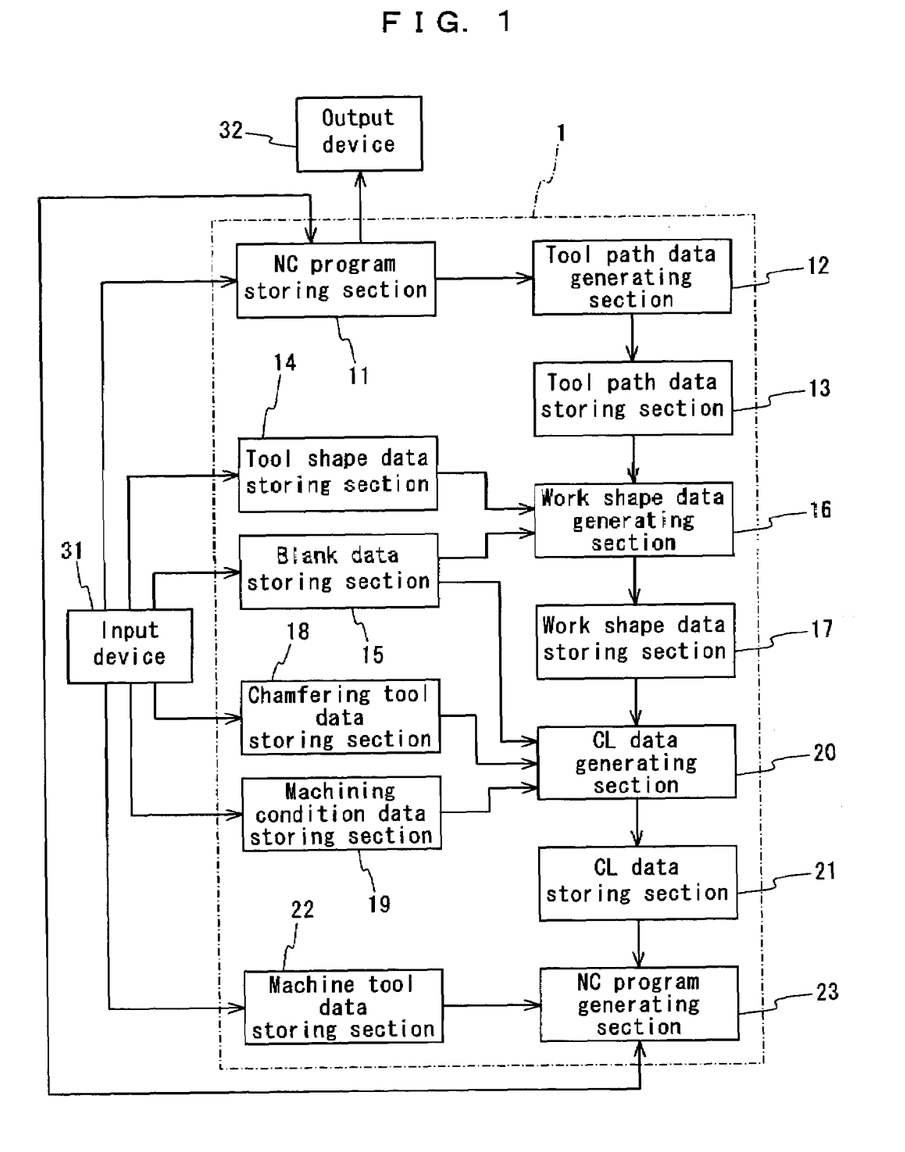
FIG. 1 is a block diagram showing the general configuration of an automatic programming apparatus according to one embodiment of the present invention.

A preferred embodiment of the present invention will be described below with reference to the accompanying drawings. FIG. 1 is a block diagram showing the general configuration of an automatic programming apparatus according to one embodiment of the present invention.

As shown in FIG. 1, the automatic programming apparatus 1 of this embodiment comprises an NC program storing section 11, a tool path data generating section 12, a tool path data storing section 13, a tool shape data storing section 14, a blank data storing section 15, a work shape data generating section 16, a work shape data storing section 17, a chamfering tool data storing section 18, a machining condition data storing section 19, a CL data generating section 20, a CL data storing section 21, a machine tool data storing section 22, and an NC program generating section 23.

An input device 31 is connected to the NC program storing section 11, tool shape data storing section 14, blank data storing section 15, chamfering tool data storing section 18, machining condition data storing section 19, and machine tool data storing section 22, and an output device 32 is connected to the NC program storing section 11.

The NC program storing section 11 stores an NC program organized so as to machine a blank to be machined into a semifinished workpiece of a prescribed shape by using an appropriate kind of tool such as an end mill or a face mill, i.e., a semifinishing NC program composed by including at least the movement position of the tool, and an NC program into which a chamfering NC program to be described later and the semifinishing NC program are combined together. The semifinishing NC program is generated by an automatic programming apparatus or the like not shown, and is stored via the input device 31 into the NC program storing section 11.

The tool path data generating section 12 analyzes the semifinishing NC program stored in the NC program storing section 11, extracts the movement position of the tool, and then performs processing to generate tool path data concerning the movement path of the tool. The tool path data generated by the tool path data generating section 12 is stored in the tool path data storing section 13.

The tool shape data storing section 14 stores shape data defining the shape of the tool to be used when machining the blank into the semifinished workpiece (the tool designated in the semifinishing NC program), while the blank data storing section 15 stores shape data defining the shape of the blank and material data concerning the material of the blank; these data are generated using, for example, a CAD apparatus, and stored via the input device 31 into the tool shape data storing section 14 and the blank data storing section 15, respectively.

Figure 2:
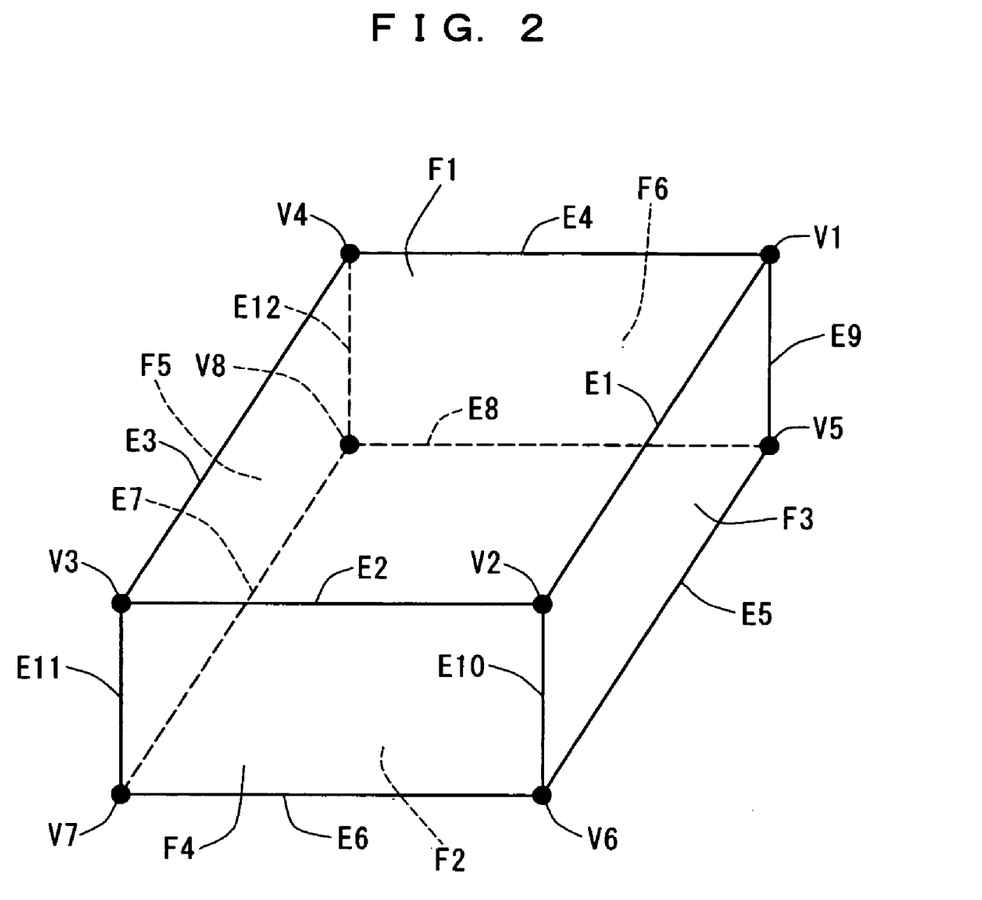
FIG. 2 is an explanatory diagram for explaining shape data in the present embodiment.
Figure 3:
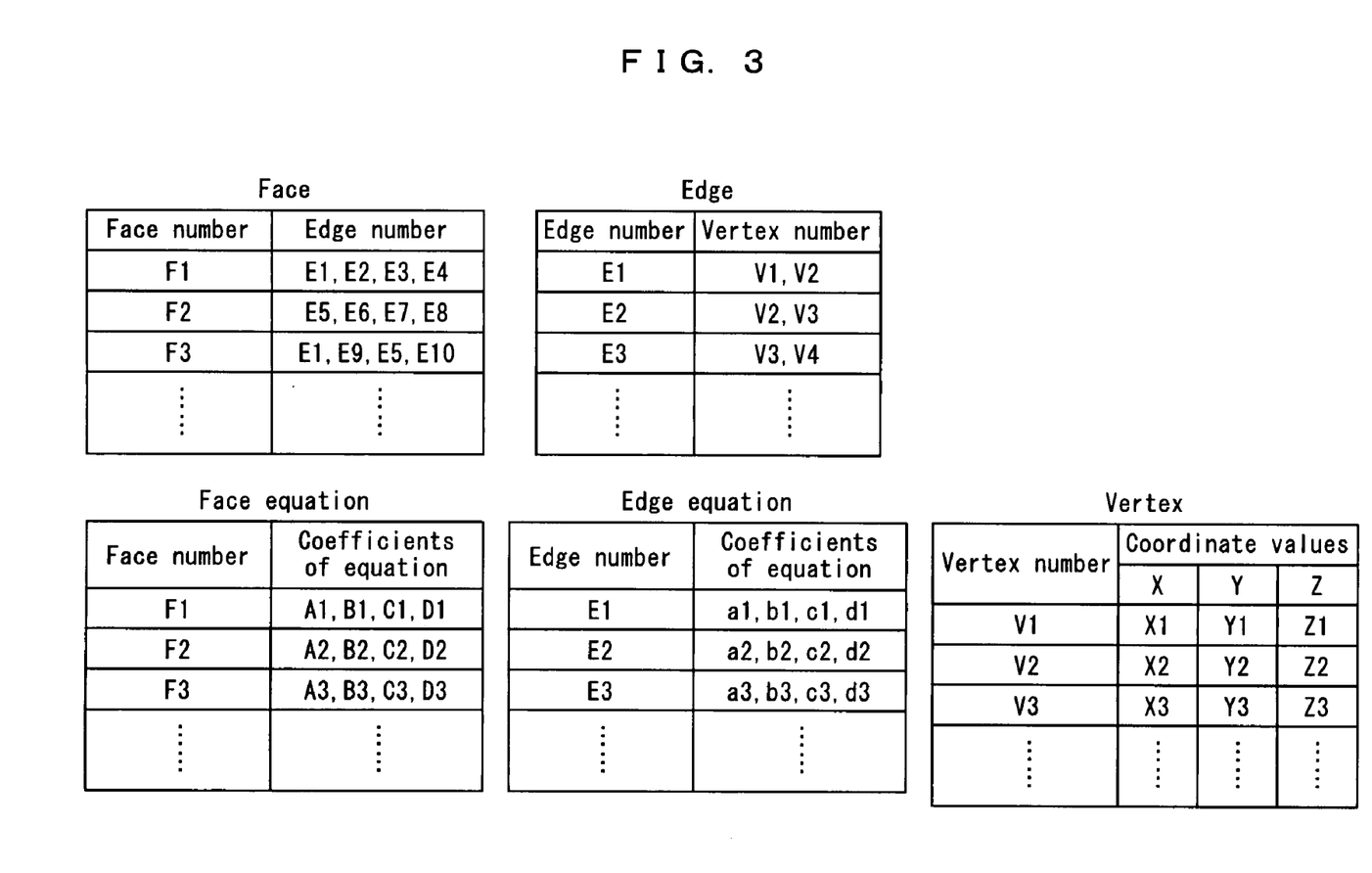
FIG. 3 is an explanatory diagram showing the data structure of the shape data in the present embodiment.

The shape data includes data of vertices each described by a coordinate value in three-dimensional space, equation data of edges each being a line joining two vertices, edge data for associating each edge with the two vertices, equation data of faces each bounded by edges, and face data for associating each face with the edges; for example, in the case of the shape of a rectangular parallelepiped such as shown in FIG. 2, the data structure is as shown in FIG. 3.

The work shape data generating section 16 performs processing to generate shape data of the semifinished workpiece and attribute data, based on the tool path data stored in the tool path data storing section 13 and the shape data respectively stored in the tool shape data storing section 14 and the blank data storing section 15.

More specifically, the work shape data generating section 16 first reads out the tool path data stored in the tool path data storing section 13 and the shape data respectively stored in the tool shape data storing section 14 and the blank data storing section 15.

Then, the work shape data generating section 16 successively computes areas over which the blank is to be machined by the semifinishing tool when the tool is successively moved along the tool path, and generates the shape data of the semifinished workpiece by performing processing to delete the computed machined areas from the blank shape, while also generating the attribute data indicating that the faces newly generated by performing processing to delete the machined areas from the blank shape are the machined faces.

Figure 4:
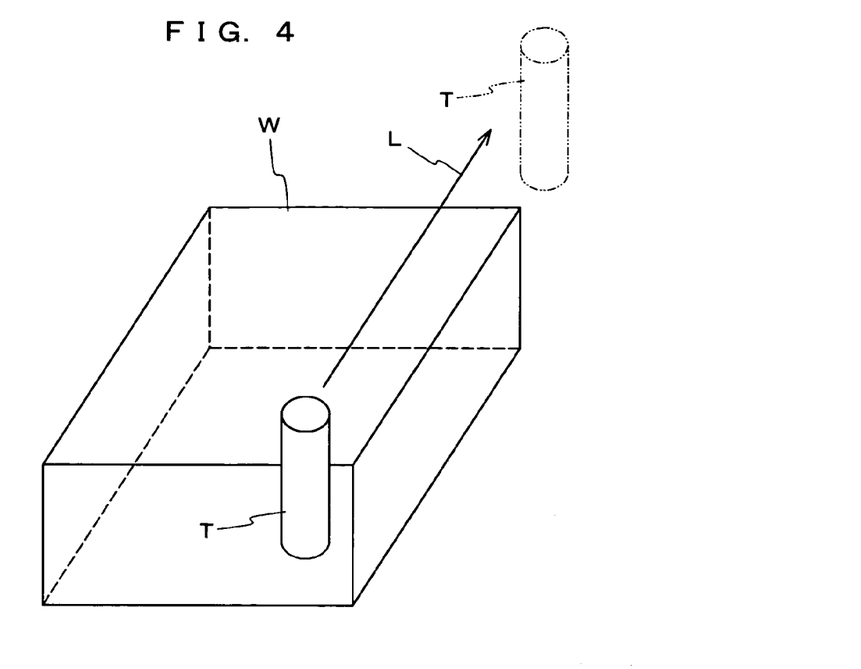
FIG. 4 is an explanatory diagram for explaining processing performed in a work shape data generating section according to the present embodiment.
Figure 5:
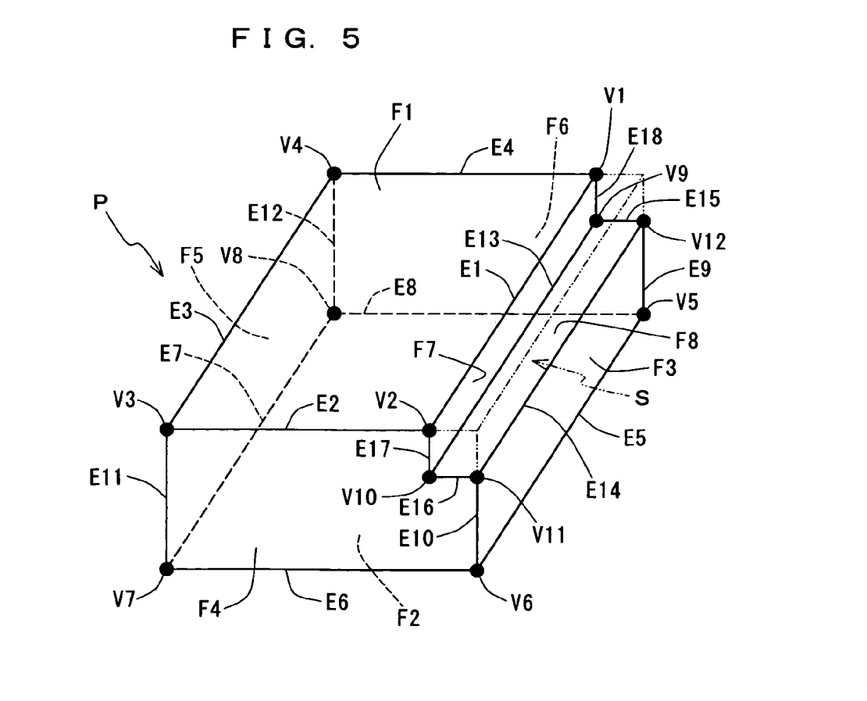
FIG. 5 is an explanatory diagram for explaining shape data of a semifinished workpiece in the present embodiment.

For example, when a tool T is moved along a tool path L, as shown in FIG. 4, relative to blank W having the shape of a rectangular parallelepiped such as shown in FIG. 2, the blank W will be machined into a semifinished workpiece P having the shape shown in FIG. 5. In this case, after computing the area S over which the blank W is machined by the tool T, in other words, after computing the area S over which the shape of the tool T interferes with the shape of the blank W when the tool T is moved along the tool path L relative to the blank W, the blank shape data is updated by generating new faces (faces indicated by face numbers F7 and F8) in the portion of the blank shape corresponding to the interference area S so as to obtain a shape by subtracting the interference area S from the blank shape by performing, for example, a Boolean operation or the like. The shape data concerning the semifinished workpiece P obtained by machining the blank W is thus generated.

Figure 6:
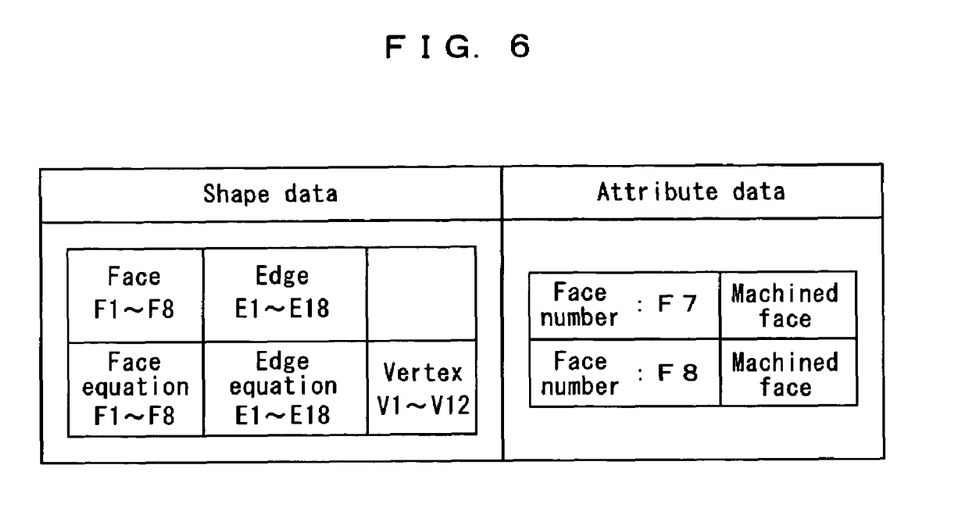
FIG. 6 is an explanatory diagram showing the data structure of the shape data of the semifinished workpiece and attribute data stored in a work shape data storing section according to the present embodiment.

At this time, the attribute data is also generated that indicates that the newly generated faces (faces indicated by face numbers F7 and F8) are the machined faces (faces machined by the tool T), and the thus generated shape data of the semifinished workpiece and attribute data are associated with each other and stored in the work shape data storing section 17 as a data table such as shown in FIG. 6. In this case, data relating to the face numbers is associated with the attribute data.

The chamfering tool data storing section 18 stores data concerning the specifications of the chamfering tool for performing chamfering. The tool specification data is data concerning the dimensions, material, etc. of the chamfering tool, and is stored in the chamfering tool data storing section 18 via the input device 31.

The machining condition data storing section 19 stores data concerning the machining conditions. The machining condition data is data concerning the feed rate (feed per tooth), cutting speed, etc. of the chamfering tool; the data is set for each chamfering tool in accordance with the material of the blank and the material of the tool, and is stored in the machining condition data storing section 19 via the input device 31.

Based on the data respectively stored in the blank data storing section 15, the work shape data storing section 17, the chamfering tool data storing section 18, and the machining condition data storing section 19, the CL data generating section 20 generates chamfering CL data which at least includes data concerning the tool used for chamfering, data concerning the feed speed and rotational speed of the tool, and data concerning the movement position of the chamfering tool in a work coordinate system.

More specifically, the CL data generating section 20 generates the CL data by sequentially performing the processing described hereinafter. First, the shape data of the semifinished workpiece and attribute data are read out of the work shape data storing section 17 and, of the plurality of faces forming the semifinished workpiece, the faces machined by the tool and their shapes are recognized based on the thus readout shape data and attribute data; then, the edges of the recognized machined faces are set as machining portions, and the sequence of machining is determined for the thus set machining portions.

For example, suppose that the readout shape data and attribute data are the data shown in FIG. 6 and concern the semifinished workpiece P shown in FIG. 5. Then, after confirming based on the attribute data that, of the faces F1 to F8 forming the semifinished workpiece P, the faces F7 and F8 are the faces machined by the tool, the shapes of these faces F7 and F8 are recognized based on the shape data, and the edges of the recognized faces, that is, the edges designated by edge numbers E1, E14, E15, E16, E17, and E18, are set as the machining portions.

Next, the blank material data stored in the blank data storing section 15 is read out, and the chamfering tool to be used for the machining is selected based on the readout blank material data by referring to the data stored in the chamfering tool data storing section 18. After that, based on the blank material data and the data concerning the tool to be used, the machining conditions are set by referring to the data stored in the machining condition data storing section 19.

Next, after setting the counter to 1, data concerning the rotational speed and feed speed of the chamfering tool is generated for the first machining portion based on the above set machining conditions, while also generating the movement position data of the chamfering tool in the work coordinate system, and the thus generated data are set as the CL data for that machining portion.

The above process is repeated while updating the counter and, after generating the CL data for all the machining portions, the generated CL data is stored in the CL data storing section 21, and the process is terminated.

The machine tool data storing section 22 stores data concerning the specifications of the machine tool. The machine tool data is data concerning the type of the machine tool, such as machining center, lathe, etc., and the structure and other features of the machine tool, and is stored in the machine tool data storing section 22 via the input device 31.

The NC program generating section 23, first based on the machine tool data stored in the machine tool data storing section 22, generates the chamfering NC program from the movement position in the work coordinate system defined in the CL data stored in the CL data storing section 21, and then, based on the chamfering NC program thus generated and the semifinishing NC program stored in the NC program storing section 11, performs processing to organize these NC programs into one NC program for executing the semifinishing and the chamfering in succession.

Then, the series of NC programs generated by the NC program generating section 23 is stored in the NC program storing section 11 and output as needed via the output device 32.

The work coordinate system here is the coordinate system that is set for the work (blank or semifinished workpiece) fixed on the machine tool.

Thus, according to the automatic programming apparatus 1 of the present embodiment having the above-described configuration, first the semifinishing NC program stored in the NC program storing section 11 is analyzed by the tool path data generating section 12, and the tool path data concerning the movement path of the tool to be used for the semifinishing is generated and stored in the tool path data storing section 13.

Next, based on the data respectively stored in the tool path data storing section 13, the tool shape data storing section 14, and the blank data storing section 15, the work shape data generating section 16 successively computes the areas over which the blank is to be machined by the semifinishing tool when the tool is successively moved along the tool path, and generates the shape data of the semifinished workpiece by performing processing to delete the computed machined areas from the blank shape, while also generating the attribute data indicating that the faces newly generated by performing processing to delete the machined areas from the blank shape are the machined faces. The thus generated shape data of the semifinished workpiece and attribute data are associated with each other and stored in the work shape data storing section 17.

Next, based on the data respectively stored in the blank data storing section 15, the work shape data storing section 17, the chamfering tool data storing section 18, and the machining condition data storing section 19, the CL data generating section 20 generates the chamfering CL data which at least includes data concerning the tool used for chamfering, data concerning the feed speed and rotational speed of the tool, and data concerning the movement position of the chamfering tool in the work coordinate system. The CL data thus generated is stored in the CL data storing section 21.

Here, when generating the CL data, the machined faces of the semifinished workpiece and their shapes are recognized based on the shape data of the semifinished workpiece and attribute data stored in the work shape data storing section 17, and the edges of the recognized machined faces are set as the machining portions.

Next, based on the data stored in the machine tool data storing section 22, the NC program generating section 23 converts the CL data stored in the CL data storing section 21 into the chamfering NC program; then, based on the chamfering NC program thus converted and the semifinishing NC program stored in the NC program storing section 11, these NC programs are organized into one NC program for executing the semifinishing and the chamfering in succession, and the NC program thus organized is stored in the NC program storing section 11.

As described above, according to the automatic programming apparatus 1 of the present embodiment, the shape data of the semifinished workpiece is generated by deleting from the blank shape data the areas of the blank to be machined by the tools, while also generating the attribute data indicating that the faces newly generated by deleting the machined areas are the machined faces, and the thus generated shape data and attribute data are stored by associating them with each other; then, based on the thus stored shape data and attribute data, the machined faces of the semifinished workpiece and their shapes are recognized, and the edges of the recognized machined faces are set as the portions to be chamfered. Accordingly, the chamfering NC program can be generated accurately and efficiently by automatically selecting only the portions that need chamfering. Then, using the thus generated NC program, burrs generated on the edges of the machined faces of the semifinished workpiece during the machining by the machine tool can be effectively removed by the machine tool.

Furthermore, based on the thus generated chamfering NC program and the semifinishing NC program, these NC programs are organized into one NC program for executing the semifinishing and the chamfering in succession; this serves to enhance the efficiency, since the series of machining operations in the machine tool for machining the blank into the final product shape can be performed using one NC program.

While the present invention has been described above with reference to one embodiment, it will be appreciated that the specific modes that can carry out the present invention are by no means limited to the above specific embodiment.

What is claimed is:

1. An automatic programming apparatus which automatically generates an NC program for applying chamfering on edges of machined faces of a semifinished workpiece obtained by machining a blank to be machined into a predetermined shape, said apparatus comprising:
   - an NC program storing section which stores an NC program organized so as to machine said blank into said semifinished workpiece, said NC program including at least movement position of a tool;
   - a blank data storing section which stores shape data defining the shape of said blank and material data concerning the material of said blank;
   - a tool shape data storing section which stores shape data defining the shape of said tool to be used for machining into said semifinished workpiece;
   - a work shape data storing section which stores shape data defining the shape of said semifinished workpiece;
   - a chamfering tool data storing section for storing data concerning specifications, such as dimensions and material, of a chamfering tool;
   - a machining condition data storing section which stores machining conditions that are set in accordance with the material of said blank and the specifications of said chamfering tool;
   - a tool path data generating section which analyzes said NC program stored in said NC program storing section and, after extracting the movement position of said tool, generates tool path data concerning the movement path of said tool;
   - a work shape data generating section which, based on said shape data respectively stored in said blank data storing section and said tool shape data storing section and on said tool path data generated by said tool path data generating section, successively computes areas over which said blank is to be machined by said semifinishing tool when said semifinishing tool is successively moved along said tool path, and which generates shape data relating to said semifinished workpiece by performing processing to delete said computed machined areas from the shape of said blank and also generates attribute data indicating that faces newly generated by performing processing to delete said machined areas from the shape of said blank are said machined faces, said generated shape data of said semifinished workpiece and attribute data then being associated with each other and stored in said work shape data storing section;
   - a CL data generating section which, based on said shape data of said semifinished workpiece and attribute data stored in said work shape data storing section, recognizes said machined faces of said semifinished workpiece and the shapes of said machined faces and sets the edges of said recognized machined faces as machining portions, and then, based on said blank material data stored in said blank data storing section and said data respectively stored in said chamfering tool data storing section and said machining condition data storing section, generates chamfering CL data of said set portions which at least includes data concerning tool used for chamfering, data concerning feed speed and rotational speed of said chamfering tool, and data concerning movement position of said chamfering tool in a work coordinate system; and
   - an NC program generating section which generates a chamfering NC program from said movement position in said work coordinate system defined in said CL data generated by said CL data generating section.

2. An automatic programming apparatus as set forth in claim 1, wherein said NC program generating section, based on said generated chamfering NC program and said semifinishing NC program stored in said NC program storing section, performs processing to organize said NC programs into one NC program for executing said semifinishing and said chamfering in succession.

* * * * *